United States Patent [19]
Hoyt et al.

[11] Patent Number: 5,706,492
[45] Date of Patent: Jan. 6, 1998

[54] METHOD AND APPARATUS FOR IMPLEMENTING A SET-ASSOCIATIVE BRANCH TARGET BUFFER

[75] Inventors: Bradley D. Hoyt; Glenn J. Hinton, both of Portland; David B. Papworth; Ashwani Kumar Gupta, both of Beaverton; Michael Alan Fetterman, Hillsboro; Subramanian Natarajan; Sunil Shenoy, both of Portland; Reynold V. D'Sa, Aloha, all of Oreg.

[73] Assignee: Intel Corporation, Santa Clara, Calif.

[21] Appl. No.: 687,975

[22] Filed: Jul. 29, 1996

Related U.S. Application Data

[63] Continuation of Ser. No. 177,155, Jan. 4, 1994, Pat. No. 5,574,871.
[51] Int. Cl.⁶ .................................................... G06F 9/38
[52] U.S. Cl. ............................................ 395/585; 395/580
[58] Field of Search ...................................... 395/580, 585

[56] References Cited

U.S. PATENT DOCUMENTS

| | | | |
|---|---|---|---|
| 4,679,141 | 7/1987 | Pomerene et al. | 395/587 |
| 4,860,197 | 8/1989 | Langendorf et al. | 395/585 |
| 5,142,634 | 8/1992 | Fite et al. | 395/587 |
| 5,210,831 | 5/1993 | Emma et al. | 395/587 |
| 5,265,213 | 11/1993 | Weiser et al. | 395/587 |
| 5,283,873 | 2/1994 | Steely, Jr. et al. | 395/383 |
| 5,414,822 | 5/1995 | Saito et al. | 395/587 |

*Primary Examiner*—Krisna Lim
*Attorney, Agent, or Firm*—Blakely, Sokoloff, Taylor & Zafman

[57] ABSTRACT

A Branch Target Buffer Circuit in a computer processor that predicts branch instructions with a stream of computer instructions is disclosed. The Branch Target Buffer Circuit uses a Branch Target Buffer Cache that stores branch information about previously executed branch instructions. The branch information stored in the Branch Target Buffer Cache is addressed by the last byte of each branch instruction. When an Instruction Fetch Unit in the computer processor fetches a block of instructions it sends the Branch Target Buffer Circuit an instruction pointer. Based on the instruction pointer, the Branch Target Buffer Circuit looks in the Branch Target Buffer Cache to see if any of the instructions in the block being fetched is a branch instruction. When the Branch Target Buffer Circuit finds an upcoming branch instruction in the Branch Target Buffer Cache, the Branch Target Buffer Circuit informs an Instruction Fetch Unit about the upcoming branch instruction.

19 Claims, 16 Drawing Sheets

| pDst Entry Number | VALID 201 | MICRO-OP RESULT DATA 202 | FLAGS 203 | FLAG MASK 204 | LDST 205 | FAULT 206 |
|---|---|---|---|---|---|---|
| 0 | | | | | | |
| 1 | | | | | | |
| 2 | | | | | | |
| 3 | | | | | | |
| 4 | | | | | | |
| 5 | | | | | | |
| n-1 | | | | | | |

REORDER BUFFER (ROB) 83

*Figure 3*

| BTB CACHE SET ADDRESS | BRANCH ENTRY 0 | BRANCH ENTRY 1 | BRANCH ENTRY 2 | BRANCH ENTRY 3 420 | LRR BITS 421 | BRANCH SET PATTERN TABLE |
|---|---|---|---|---|---|---|
| 0 | | | | | | |
| 1 | | | | | | |
| 2 | | | | | | |
| 3 | | | | | | |
| 124 | | | | | | |
| 125 | | | | | | |
| 126 | | | | | | |
| 127 | | | | | | |

Branch Target Buffer Cache 41

*Figure 6*

A Branch entry from the Branch Target Buffer Cache 41

| BIT Entry Number | Next Linear Instruction Pointer Address | Processor State Information |
|---|---|---|
| 0 | | |
| 1 | | |
| 2 | | |
| 3 | ⋮ | ⋮ |
| n-1 | | |

Branch IP Table (BIT) 43

*Figure 11*

METHOD AND APPARATUS FOR IMPLEMENTING A SET-ASSOCIATIVE BRANCH TARGET BUFFER

This is a continuation of application Ser. No. 08/177,155, filed Jan. 4, 1994, now U.S. Pat No. 5,574,871.

FIELD OF THE INVENTION

This invention relates to the field of microprocessor architecture. Specifically, the invention relates to a Branch Target Buffer Circuit that predicts branch instructions within an instruction stream.

ART BACKGROUND

Early microprocessors generally processed instructions one at a time. Each instruction was processed using four sequential stages: instruction fetch, instruction decode, execute, and result writeback. Within such microprocessors, different dedicated logic blocks performed each different processing stage. Each logic block waited until all the previous logic blocks complete operations before beginning its operation.

To improve efficiency, microprocessor designers overlapped the operations of the fetch, decode, execute, and writeback logic stages such that the microprocessor operated on several instructions simultaneously. In operation, the fetch, decode, execute, and writeback logic stages concurrently process different instructions. At each clock tick the result of each processing stage is passed to the following processing stage. Microprocessors that use the technique of overlapping the fetch, decode, execute, and writeback stages are known as "pipelined" microprocessors. Some microprocessors further divide each processing stage into substages for additional performance improvement. Such processors are referred to as "deeply pipelined" microprocessors.

In order for a pipelined microprocessor to operate efficiently, an instruction fetch unit at the head of the pipeline must continually provide the pipeline with a stream of microprocessor instructions. However, conditional branch instructions within an instruction stream prevent the instruction fetch unit from fetching subsequent instructions until the branch condition is fully resolved. In pipelined microprocessor, the branch condition will not be fully resolved until the branch instruction reaches an instruction execution stage near the end of the microprocessor pipeline. Accordingly, the instruction fetch unit will stall because the unresolved branch condition prevents the instruction fetch unit from knowing which instructions to fetch next.

To alleviate this problem, many pipelined microprocessors use branch prediction mechanisms that predict the existence and the outcome of branch instructions within an instruction stream. The instruction fetch unit uses the branch predictions to fetch subsequent instructions. For example, Yeh & Patt introduced a highly accurate two-level adaptive branch prediction mechanism. (See Tse Yu Yeh and Yale N. Patt, *Two-Level Adaptive Branch Prediction*. The 24th ACM/IEEE International Symposium and Workshop on Microarchitecture, November 1991, pp. 51–61) The Yeh & Part branch prediction mechanism makes branch predictions based upon two levels of collected branch history.

When a branch prediction mechanism predicts the outcome of a branch instruction and the microprocessor executes subsequent instructions along the predicted path, the microprocessor is said to have "speculatively executed" along the predicted instruction path. During speculative execution the microprocessor is performing useful processing if the branch instruction was predicted correctly. However, if the branch prediction mechanism mispredicted the branch instruction, then the microprocessor is speculatively executing instructions down the wrong path and therefore accomplishes nothing. When the microprocessor eventually detects the mispredicted branch, the microprocessor must flush all the speculatively executed instructions and restart execution at the correct address.

Since the microprocessor accomplishes nothing when a branch instruction is mispredicted, it is desirable to accurately predict branch instructions. This is especially true for deeply pipelined microprocessors wherein a long instruction pipeline will be flushed each time a branch misprediction is made.

SUMMARY OF THE INVENTION

It is therefore an object of the present invention to provide a branch prediction mechanism that accurately predicts the existence of branch instructions within an instruction stream.

It is a further object of the present invention to accurately predict the branch outcome of all the branch instructions predicted within the instruction stream.

It is yet another object of the present invention to accurately predict a branch target address for all the branch instructions predicted that are predicted taken.

These and other objectives are accomplished by Branch Target Buffer Circuit of the present invention. The Branch Target Buffer Circuit of the present invention comprises a Branch Target Buffer Cache. The Branch Target Buffer Cache stores information about previously executed branch instructions. The branch information stored in the Branch Target Buffer Cache is addressed by the last byte of each branch instruction. When the Instruction Fetch Unit fetches a block of instructions it sends the Branch Target Buffer Circuit the instruction pointer. Based on this instruction pointer, the Branch Target Buffer Circuit looks in the Branch Target Buffer Cache to see if any of the instructions in the block being fetched is a branch instruction. When the Branch Target Buffer Circuit finds an upcoming branch instruction in the Branch Target Buffer Cache, the Branch Target Buffer Circuit informs an Instruction Fetch Unit that is responsible for fetching future instructions.

BRIEF DESCRIPTION OF THE DRAWINGS

The objects, features and advantages of the present invention will be apparent to one skilled in the art, in view of the following detailed description and drawings in which:

FIG. 3 is a diagram of a reorder buffer that stores the results of executed micro operations.

FIG. 6 is a diagram illustrating the contents of the Branch Target Buffer Cache in the Branch Target Buffer Circuit.

FIG. 11 is a diagram illustrating the contents of the Branch IP Table (BIT) in the Branch Target Buffer Circuit.

DETAILED DESCRIPTION OF THE INVENTION

Methods and apparatus for implementing a Branch Target Buffer Circuit in a computer processor are disclosed. In the following description, for purposes of explanation, specific nomenclature is set forth to provide a thorough understanding of the present invention. However, it will be apparent to one skilled in the art that these specific details are not required in order to practice the present invention. Furthermore, well known circuits and devices are shown in block diagram form in order not to obscure the present invention unnecessarily.

A Pipelined Superscalar Microprocessor

Figure 1:
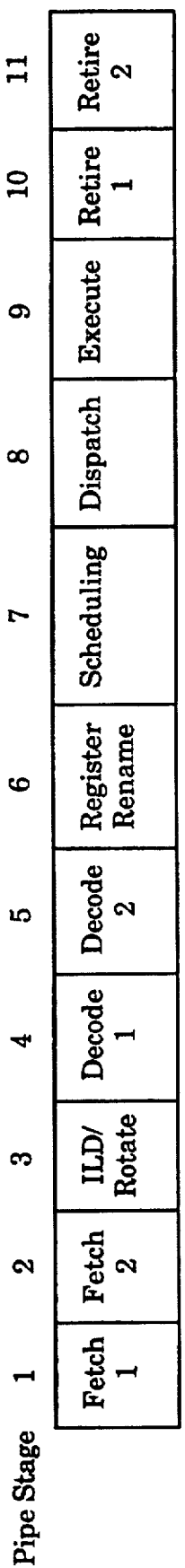
FIG. 1 is a block diagram of a deep microprocessor pipeline for processing microprocessor instructions.

In a deeply pipelined processor, the major stages of a pipelined processor such as instruction fetch, instruction decode, and instruction execute, are divided into several different substages such that each processing stage is pipelined. This results in a long instruction pipeline. For example, FIG. 1 illustrates a set of pipeline stages that defines one particular deeply pipelined processor. In the instruction pipeline of FIG. 1, the instruction processing is divided into 11 pipeline stages.

Referring to FIG. 1, the first two pipeline stages are used to fetch instructions. Pipestage 3 performs Instruction Length Decoding (ILD). Individual microprocessor instructions are then decoded at pipeline stages 4 and 5. The next 3 pipeline stages (Register Rename, Scheduling, and Dispatch) prepare instructions for execution. Finally, the microprocessor executes instructions at pipeline stage 9. The last two pipeline stages retire instructions that have been executed.

To operate the microprocessor efficiently, the two instruction fetch pipeline stages in FIG. 1 must continually fetch a stream of microprocessor instructions. Each fetched instruction is not fully executed until it reaches pipeline stage 9, the execution stage. Branch instructions within the instruction stream often direct the microprocessor to begin executing instructions at a nonsequential address called the branch target address. When a pipelined microprocessor encounters a branch instruction, the instruction fetch stages can not immediately react to the branch since the branch instruction has not yet been decoded or executed. Thus, branch instructions can cause a deeply pipelined microprocessor to speculatively execute down the wrong path such that the microprocessor must later flush the speculatively executed instructions and restart at a corrected address.

To prevent such situations, many pipelined microprocessors employ a branch prediction mechanism that predicts branch instructions within the instruction stream. Furthermore, such branch prediction mechanisms predict the outcome and branch target address of such branch instructions.

To predict branch instructions in a microprocessor containing a deep pipeline such as the pipeline illustrated in FIG. 1, the present invention comprises a Branch Target Buffer Circuit that predicts the existence of branch instructions within the instruction stream. The Branch Target Buffer Circuit of present invention is disclosed within the context of a deeply pipelined superscalar microprocessor. However, it will be apparent to those skilled in the art that individual features of the disclosed Branch Target Buffer Circuit can be implemented in other microprocessors within different architectures.

Figure 2:
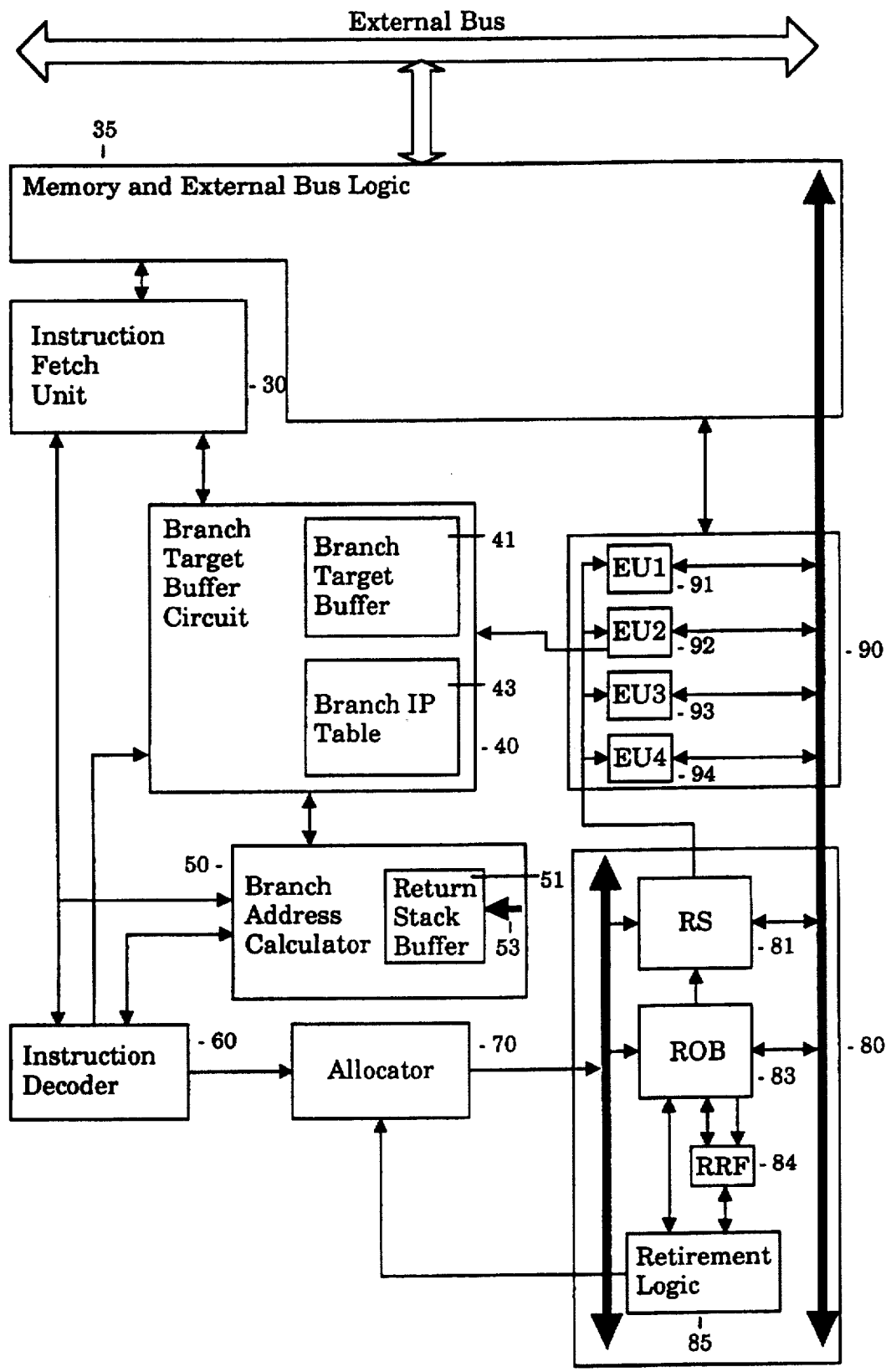
FIG. 2 is a block diagram of the different circuit blocks in a microprocessor that implements the deep pipeline illustrated in FIG. 1.

FIG. 2 illustrates, in block diagram form, the major logic circuits of a deeply pipelined superscalar microprocessor that implements the deep pipeline illustrated in FIG. 1. An overview of the microprocessor illustrated in FIG. 2 is provided, followed by a detailed description of the Branch Target Buffer Circuit 40 that predicts the existence of branch instructions within the instruction stream.

At the top of the block diagram of FIG. 2 is Memory & Bus Logic 35. The Memory & Bus Logic 35 is responsible for loading information into the microprocessor and outputting information from the microprocessor. The Memory & Bus Logic 35 usually first attempts to load or store from a high speed cache memory. If the cache memory cannot be used (perhaps due to a cache "miss"), the Memory & Bus Logic 35 instead accesses a main memory over an external bus.

Coupled to the Memory & Bus Logic 35 is an Instruction Fetch Unit 30. The Instruction Fetch Unit 30 is responsible for continually fetching new microprocessor instructions (also known as macro instructions) and operands for the microprocessor to execute. The Instruction Fetch Unit 30 uses an instruction pointer (IP) to maintain the current fetch address. The fetched microprocessor instructions are fed into the head of the instruction pipeline.

Simple unconditional branch instructions within the instruction stream prevent the Instruction Fetch Unit 30 from simply fetching instructions along a sequential path. Furthermore, conditional branch instructions within the instruction stream prevent the Instruction Fetch Unit 30 from simply fetching instructions along a predefined path since the branch condition must be resolved to determine the fetch path. To help fetch the correct instructions, the Instruction Fetch Unit 30 consults a Branch Target Buffer Circuit 40. The Branch Target Buffer Circuit 40 predicts the existence of branch instructions within the instruction stream and predicts the outcome of each predicted branch instruction. The Branch Target Buffer Circuit 40 passes its branch prediction information back to the Instruction Fetch Unit 30 such that the Instruction Fetch Unit 30 can fetch the proper instructions.

After the Instruction Fetch Unit 30 fetches each microprocessor instruction, the Instruction Fetch Unit 30 passes each microprocessor instruction to an Instruction Decoder 60. If the Branch Target Buffer Circuit 40 made a branch prediction for an instruction, the Instruction Fetch Unit 30 also passes the Branch Target Buffer Circuit's branch prediction on the instruction.

The Instruction Decoder 60 is responsible for determining what type of microprocessor instruction is received and breaking down the microprocessor instruction into one or more micro-operations (hereinafter referred to as micro-ops) with associated micro-operands. The one or more micro-ops corresponding to a microprocessor instruction perform the function of the corresponding microprocessor instruction.

If the Instruction Decoder 60 determines that a received microprocessor instruction is a branch instruction, the Instruction Decoder 60 passes information describing the branch instruction to a Branch Address Calculator 50 for special treatment. If the Branch Target Buffer Circuit 40 made a branch prediction for the branch instruction, the Branch Address Calculator 50 verifies the branch prediction if possible using the branch information received from the Instruction Decoder 60. If the Branch Target Buffer Circuit 40 did not predict the branch instruction, the Branch Address Calculator 50 makes a branch prediction for the branch instruction using the branch information received from the Instruction Decoder 60. After the Branch Address Calculator 50 completes its processing of the branch instruction, the Branch Address Calculator 50 returns the processed branch information to the Instruction Decoder 60.

After the Instruction Decoder 60 breaks down a microprocessor instruction into a set of micro-ops, the Instruction Decoder 60 passes the micro-ops and associated operands to an Allocator 70. The Allocator 70 allocates the processor resources necessary to execute each micro-op.

In the present embodiment, the microprocessor is a superscalar processor that may execute the micro-ops out of the original program order. However, the executed micro-ops must eventually be retired in the original program order to properly execute the computer program. To maintain the original program order, the microprocessor uses a reorder buffer 83 that stores micro-op result data in the original program order.

FIG. 3 illustrates the reorder buffer 83. The reorder buffer 83 of FIG. 3 comprises a circular buffer that contains n entries wherein each entry is used to store the results of executed micro-ops. Since each entry in the reorder buffer 83 provides a destination where the micro-op result data can physically be put, each entry in the reorder buffer 83 is referred to as a physical destination (pDst). The pDsts within the reorder buffer 83 are numbered 0 through n−1. Referring to FIG. 3, each pDst in the reorder buffer 83 contains fields for a valid bit that indicates whether or not the micro-op result is valid, a micro-op result, a set of flags affected by the micro-op, a mask for the flags, a code that indicates what the results mean, and fault data.

For each micro-op, the Allocator 70 allocates the next available pDst in the reorder buffer 83 to store the micro-op result. By sequentially allocating the pDsts in the reorder buffer 83 in the same order that the micro-ops are received, the original program order of the micro-op results will be maintained.

When the Allocator 70 allocates a pDst in the reorder buffer 83 for a branch micro-op associated with a branch instruction, a matching entry is also allocated in a buffer called the Branch IP Table (BIT) 43 located in the Branch Target Buffer Circuit 40. The Instruction Decoder 60 then passes the Branch Target Buffer Circuit 40 the address of the instruction that immediately follows the branch instruction and a processor state value. The Branch Target Buffer Circuit 40 writes the address of the instruction that immediately follows the branch instruction and the processor state value into the Branch IP Table (BIT) 43. This information stored in the Branch IP Table (BIT) 43 is later used after the Branch Execution Unit has executed the branch micro-op.

The Allocator 70 also allocates an entry in the reservation station 81 that stores the micro-op instruction and operand data for each micro-op. Each reservation station 81 entry stores a valid bit that indicates if the reservation station 81 entry is valid, the micro-op instruction code, two source data fields, two valid bits for the source data fields, two physical source fields that indicate where the source data will come from if the source data is not valid, and a physical destination of the result of the micro-op. After the Allocator 70 allocates a reservation station entry and a pDst in the reorder buffer 83, each micro-op waits at the reservation station 81 entry until it is executed.

Each micro-op in a reservation station 81 entry remains at the reservation station 81 entry until all the source data required to execute the micro-op has been obtained and an execution unit for executing the micro-op is available. When all the source data required for a micro-op is ready and an execution unit is available, the reservation station 81 dispatches the micro-op to the execution unit in the execution cluster 90. In the present embodiment, there are four execution units (EU1 91, EU2 92, EU3 93, and EU4 94) in the execution logic circuit 90. After an execution unit executes a micro-op, the execution unit writes the result data, the architectural flags, and any fault information into the reorder buffer 83 pDst that the Allocator 70 allocated for the micro-op.

In the present embodiment, execution unit 92 is designated as a Branch Execution Unit. The Branch Execution Unit 92 determines the final branch decision outcome and the final branch target address for each branch micro-op. The Branch Execution Unit 92 compares the final branch outcome and target address with the predicted branch outcome and target address. If the Branch Execution Unit 92 detects a mispredicted branch, the Branch Execution Unit 92 initiates a set of actions that will correct the branch misprediction. Thus the Branch Execution Unit 92 comprises the third stage of the branch resolution mechanism.

Finally, a Retirement Circuit 85 retires the results that are stored in the reorder buffer 83 pDsts from each executed micro-op. The Retirement Circuit 85 retires the Reorder Buffer 83 pDsts by sequentially going through the pDsts in the Reorder Buffer 83 in the same order that the Allocator 70 allocated the pDsts. The Retirement Circuit 85 retires pDsts by transferring the micro-op results into a Real Register File (RRF) 84 that stores the current committed architectural state. Since the Allocator 70 allocated the reorder buffer 83 pDsts in original program order and the Retirement Circuit 85 retires the micro-op results in the reorder buffer 83 pDsts in that same order, original program order is maintained even though micro-ops may have been executed out of the original program order.

Referring to FIG. 3, to retire a micro-op, the retirement circuit tests the valid bit 201 of a reorder buffer pDst entry to see if the pDst contains a valid executed micro-op result. If the valid bit 201 for the pDst is set, the retirement circuit checks the fault field 206 of the pDst to see if a fault must be handled. If the reorder buffer pDst entry contains a valid executed micro-op result and there is no fault problem, then the executed micro-op result is committed to permanent architectural state in the Real Register File (RRF) 84.

When the Retirement Circuit 85 attempts to retire a branch micro-op, the Retirement Circuit 85 tests the fault field 206 of the pDst entry to see if the branch micro-op was mispredicted. If Retirement Circuit 85 detects that the micro-op was mispredicted, the Retirement Circuit 85 flushes the remainder of the instructions in the reorder buffer 83 since those instructions were fetched after a branch misprediction.

Branch Target Buffer Circuit Overview

Figure 4:
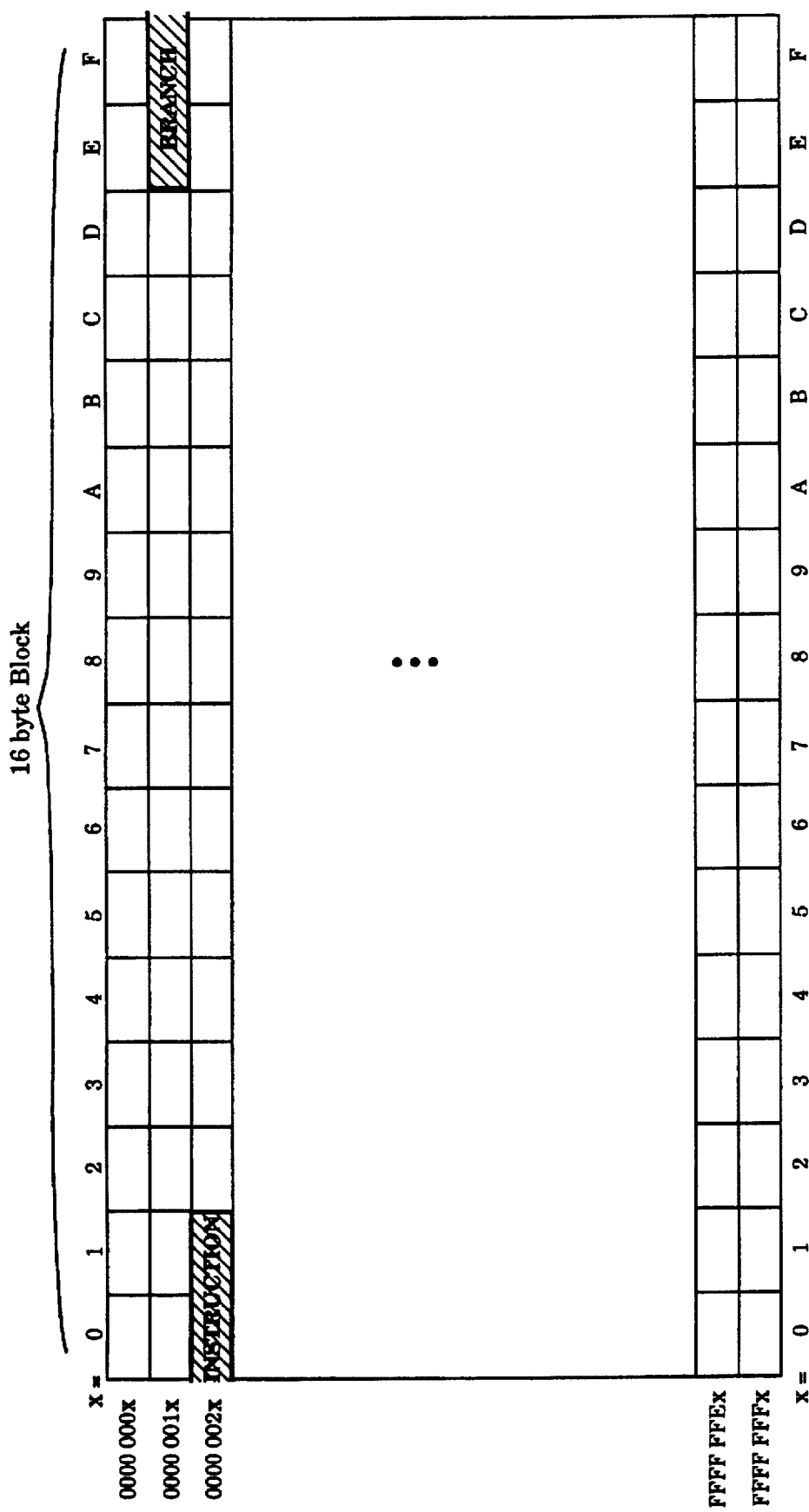
FIG. 4 is a diagram of a memory map where the address space has been divided into 16 byte memory blocks.

As described in the preceding microprocessor overview, the Instruction Fetch Unit 30 is responsible for fetching instructions into the microprocessor. The Instruction Fetch Unit 30 of the microprocessor in FIG. 2 views the memory address space as a collection of aligned 16 byte blocks such that the Instruction Fetch Unit 30 fetches instructions and operands in 16 byte blocks. FIG. 4 illustrates memory map where the address space is split into aligned 16 byte blocks. The Instruction Fetch Unit 30 uses an instruction pointer to maintain the current fetch address. When no branch instructions are encountered within the code, the Instruction Fetch Unit 30 fetches instructions and operands by sequentially fetching adjacent 16 byte blocks.

To predict the presence of branch instructions within the instruction stream, the microprocessor of FIG. 2 employs Branch Target Buffer Circuit 40. The Branch Target Buffer Circuit 40 has a Branch Target Buffer Cache 41 that contains information about branch instructions that the microprocessor has previously executed. The Branch Target Buffer Circuit 40 uses the information in the Branch Target Buffer Cache 41 to recognize branch instructions and predict the branch instruction outcome.

The Branch Target Buffer Circuit 40 also maintains a Branch IP Table (BIT) 43 that contains information about branch instructions that are currently within the microprocessor. The information in the Branch IP Table 43 is used to correct mispredicted branch instructions and maintain the Branch Target Buffer Cache 41 after the branch instructions has been executed.

Figure 5:
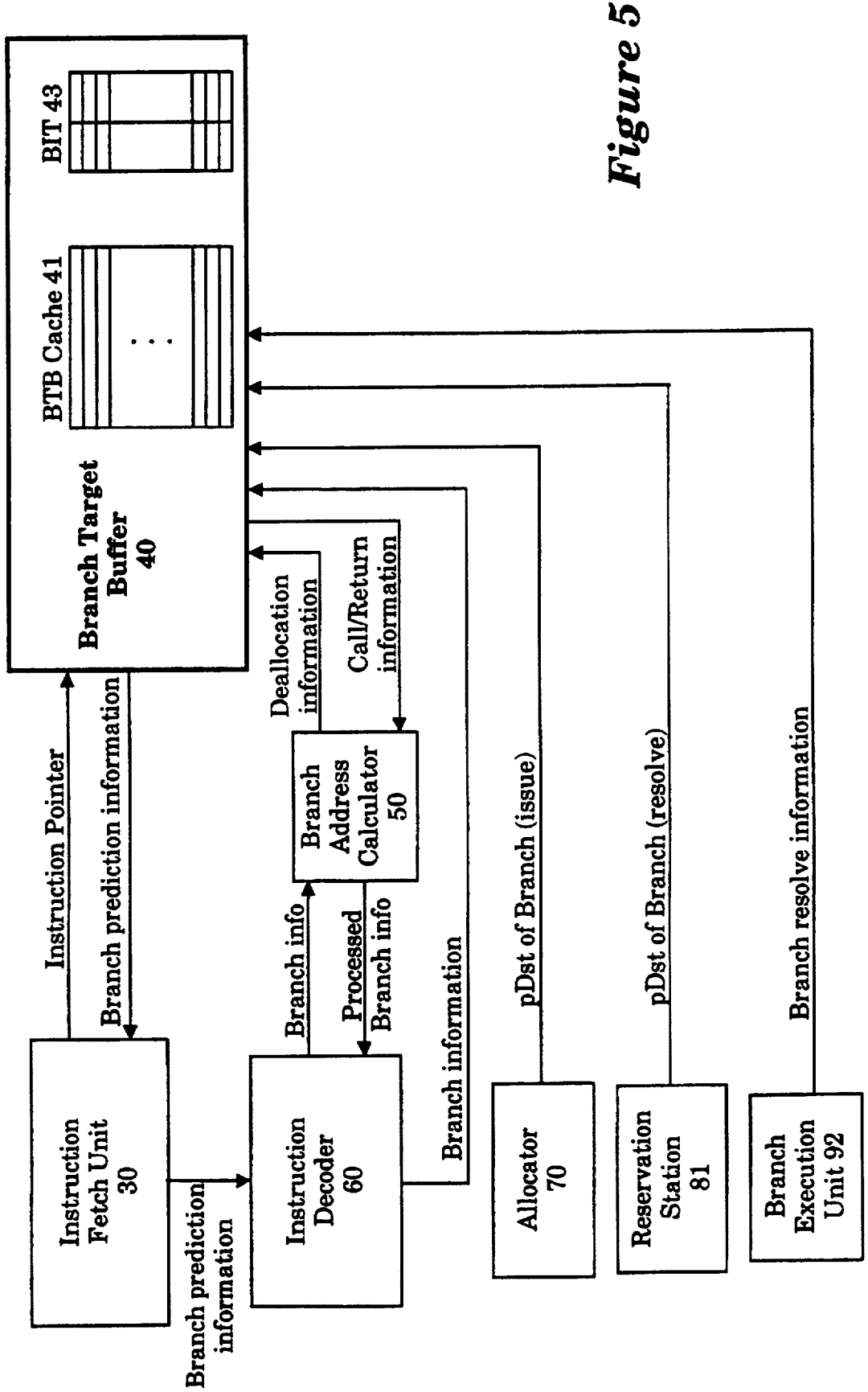
FIG. 5 is a block diagram that illustrates how the Branch Target Buffer Circuit interacts with other logic circuits in the microprocessor depicted in FIG. 2.

FIG. 5 illustrates a block diagram that generally illustrates how the Branch Target Buffer Circuit 40 interacts with other major logic circuits in the microprocessor of FIG. 2. The Instruction Fetch Unit 30 requests information about upcoming branch instructions from Branch Target Buffer Circuit 40 by passing an instruction pointer to the Branch Target Buffer Circuit 40. The instruction pointer passed to the Branch Target Buffer Circuit 40 points to the memory block currently being fetched by the Instruction Fetch Unit 30.

The Branch Target Buffer Circuit 40 searches the Branch Target Buffer Cache 41 for information about branch instructions in the memory block currently being fetched by the Instruction Fetch Unit 30. The Branch Target Buffer Circuit 40 makes a branch prediction for any branch instructions located in the memory block currently being fetched by the Instruction Fetch Unit 30 that were found in the Branch Target Buffer Cache 41. The Branch Target Buffer Circuit 40 passes the branch prediction information to the Instruction Fetch Unit 30 thereby informing the Instruction Fetch Unit 30 about any branch instructions in the memory block currently being fetched by the Instruction Fetch Unit 30.

To maintain the Branch Target Buffer Cache 41 and the Branch IP Table 43, the Branch Target Buffer Circuit 40 receives information from several other logic circuits in the microprocessor.

Referring to FIG. 5, the Instruction Decoder 60 sends branch information to Branch Target Buffer Circuit 40. The branch information sent by the Instruction Decoder 60 includes the address of the instruction immediately following the branch instruction. The Branch Target Buffer Circuit 40 stores the address of the instruction immediately following the branch instruction into the Branch IP Table 43 for later use.

The Branch Address Calculator 50 validates branch predictions made by the Branch Target Buffer Circuit 40. If the Branch Address Calculator 50 determines that the Branch Target Buffer Circuit 40 made a branch prediction for a nonexistent branch, the Branch Address Calculator 50 instructs the Branch Target Buffer Circuit 40 to deallocate an entry in the Branch Target Buffer Cache 41 containing the nonexistent branch instruction.

The Allocator 70 is responsible for allocating a reorder buffer 83 entry for each micro-op. When the Allocator 70 allocates a pDst entry in the reorder buffer 83 for a branch micro-op, the Allocator 70 provides the pDst entry number to the Branch Target Buffer Circuit 40. The Branch Target Buffer Circuit 40 uses the pDst entry number to allocate a corresponding entry in the Branch IP Table 43. The corresponding entry in the Branch IP Table 43 stores information about the branch micro-op while the branch micro-op is within the microprocessor.

The reservation station 81 stores micro-ops waiting to execute and dispatches ready micro-ops to execution units in the microprocessor. When the reservation station 81 dispatches a branch micro-op to the Branch Execution Unit 92, the reservation station 81 informs the Branch Target Buffer Circuit 40 of the pDst entry for the branch micro-op. The Branch Target Buffer Circuit 40 responds by reading out the corresponding entry for the branch instruction in the Branch IP Table 43. The information read out of the entry in the Branch IP Table 43 is used after the branch micro-op executes.

The Branch Execution Unit 92 executes branch micro-ops for the microprocessor. When the Branch Execution Unit 92 executes a branch micro-op, the Branch Execution Unit 92 provides the branch resolution information to the Branch Target Buffer Circuit 40. The Branch Target Buffer Circuit 40 uses the branch resolution information to update an existing entry in the Branch Target Buffer Cache 41 or allocate a new entry in the Branch Target Buffer Cache 41.

The Branch Target Buffer Cache

The Branch Target Buffer Circuit 40 maintains a Branch Target Buffer Cache 41 to predict the presence of branch instructions within an instruction stream and the outcome of those branch instructions. The Branch Target Buffer Cache 41 contains information about branch instructions that the microprocessor has previously executed. FIG. 6 illustrates the organization of the Branch Target Buffer Cache 41.

The Branch Target Buffer Cache 41 is set-associative cache that stores information about branch instructions located in main memory. In the present embodiment, the Branch Target Buffer Cache 41 stores information about branch instructions in 128 individual "sets" of branch information. Each set of branch information in the Branch Target Buffer Cache 41 contains 4 branch entries wherein each branch entry contains information about a single branch instruction that the microprocessor has previously executed.

Each set of branch entries within the Branch Target Buffer Cache 41 also includes a branch pattern table 421 and a pair of Pseudo-Least Recently Replaced (PLRR) bits 420. The Branch Target Buffer Circuit 40 uses the branch pattern table 421 for predicting the outcome of conditional branch instructions in the set of branch entries. The Branch Target Buffer Circuit 40 uses the Pseudo-Least Recently Replaced (PLRR) bits 420 to select a branch entry in the set when information about a new branch will be written into the set of branch entries.

Figure 7:
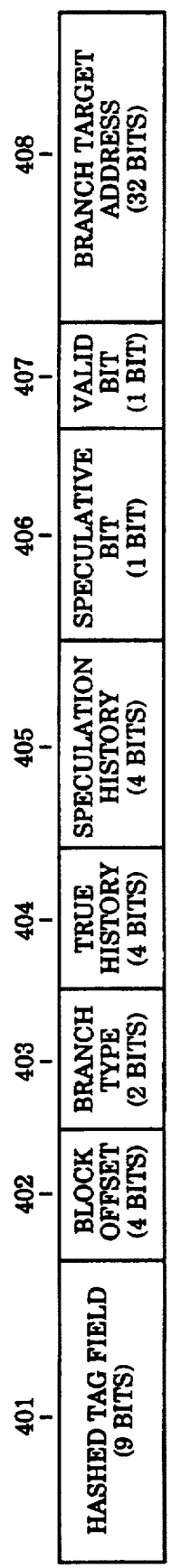
FIG. 7 is a diagram illustrating the contents of each branch entry in the Branch Target Buffer Cache.

FIG. 7 illustrates the branch information stored within each branch entry of a Branch Target Buffer Cache 41 set. As illustrated in FIG. 6, each branch entry contains a hashed tag address 401, a block offset 402, a branch type 403, a true branch history 404, a speculative branch history 405, a speculation bit 406, a valid bit 407, and a branch target address 408.

The hashed tag address 401 and the block offset 402 are used to identify a memory address of the branch instruction associated with the branch entry. The hashed tag address 401 is a 9 bit compressed representation of the 21 most significant bits of the address of the branch instruction.

The block offset value 402 indicates the byte offset within the 16 byte memory block address of the branch instruction's last byte. Branch instructions are indexed by the last byte such that every byte of a branch instruction that crosses a block boundary will be fetched before making a branch prediction. For example, referring again to the memory map of FIG. 4, a four byte long branch instruction is illustrated at the hexadecimal address 1E to 21. After being executed, the four byte branch instruction will be placed into an entry in the Branch Target Buffer Cache 41 and associated with the hexadecimal address 21. Thus the block offset 402 in the branch entry for that branch instruction will be set to 1.

If the branch instruction was instead indexed by the first byte (hexadecimal address 1E), the Branch Target Buffer Circuit 40 would instruct the Instruction Fetch Unit 30 to fetch from the branch target address before all the bytes comprising the branch instruction had been fetched. Thus, the Instruction Decoder 60 and Branch Execution Unit 92 would not be able to verify the branch instruction since the entire branch instruction was not fetched.

The branch type field 403 in each branch entry specifies what type of branch instruction the branch entry identifies. The following Table 1 lists the different types of branch instructions.

TABLE 1

| Branch Type Code | Branch Type |
|---|---|
| 00 | Conditional branch |
| 01 | Return From Subroutine |
| 10 | Call Subroutine |
| 11 | Unconditional branch |

The Branch Target Buffer Circuit 40 uses the branch type field 403 when making a branch prediction since different branch prediction mechanism is used for different type of branch instruction. For example, the Branch Target Buffer Circuit 40 predicts the outcome of conditional branch instruction based upon the branch instruction's history, but the Branch Target Buffer Circuit 40 always predicts an unconditional branch instruction as taken.

The true branch history field 404 in FIG. 7 maintains the taken or not-taken history of the branch instruction as determined by the Branch Execution Unit 92. The true branch history field 404 stores branch history for the last 4 executions of the branch instruction using 4 bits where "0" designates not-taken and "1" designates taken. The 4 bits of taken or not-taken history are used to index into a pattern state table when calculating a branch prediction. This is based on the branch outcome at branch execution.

The speculation bit 406 and the speculative branch history field 405 are used to help make predictions for branch instructions without waiting for branch instructions to execute. The speculative branch history field 405 in FIG. 7 maintains the "speculative" taken or not-taken history of the branch instruction for the last 4 branch predictions made by the Branch Target Buffer Circuit 40. The speculation bit 406 is set when the speculative branch history field 405 contains valid speculative history. The 4 bits of speculative branch history 405 are used to index into the pattern state table when calculating a branch prediction and the speculation bit 406 is set. For more information on predicting branch instructions using the speculative branch history, see the copending patent application "Speculative History Mechanism in a Branch Target Buffer", Ser. No. 08/591,233, filed Jan. 18, 1996, which is a continuation of Ser. No. 08/062, 102, filed May 14, 1993, now abandoned.

The valid bit 407 indicates whether the branch entry contains valid branch information. When the Branch Target Buffer Circuit 40 allocates and fills a branch entry, the Branch Target Buffer Circuit 40 sets the valid bit 407 for the entry thereby indicating that the entry contains valid branch information. Later, when the Branch Address Calculator 50 deallocates the branch entry, the valid bit 407 for the deallocated entry is cleared.

The branch target address field 408 in FIG. 7 stores the branch target address for the branch instruction except if the branch instruction is a Return From Subroutine instruction. If the Branch Target Buffer Circuit 40 predicts the branch instruction associated with the branch entry is taken, the address in the branch target address field 408 can be passed to the Instruction Fetch Unit 30 to inform the Instruction Fetch Unit 30 where the next instructions should be fetched from. (However, the branch target address field 408 is not always used to predict the target address.) The upper 28 bits of the branch target address field 408 select a 16 byte block that the Instruction Fetch Unit 30 should fetch if the branch is taken. The lowest 4 bits of the branch target address field 408 select the byte in the fetched block where the microprocessor should resume execution.

Predicting Branch Instructions using the Branch Target Buffer Cache

Figure 8:
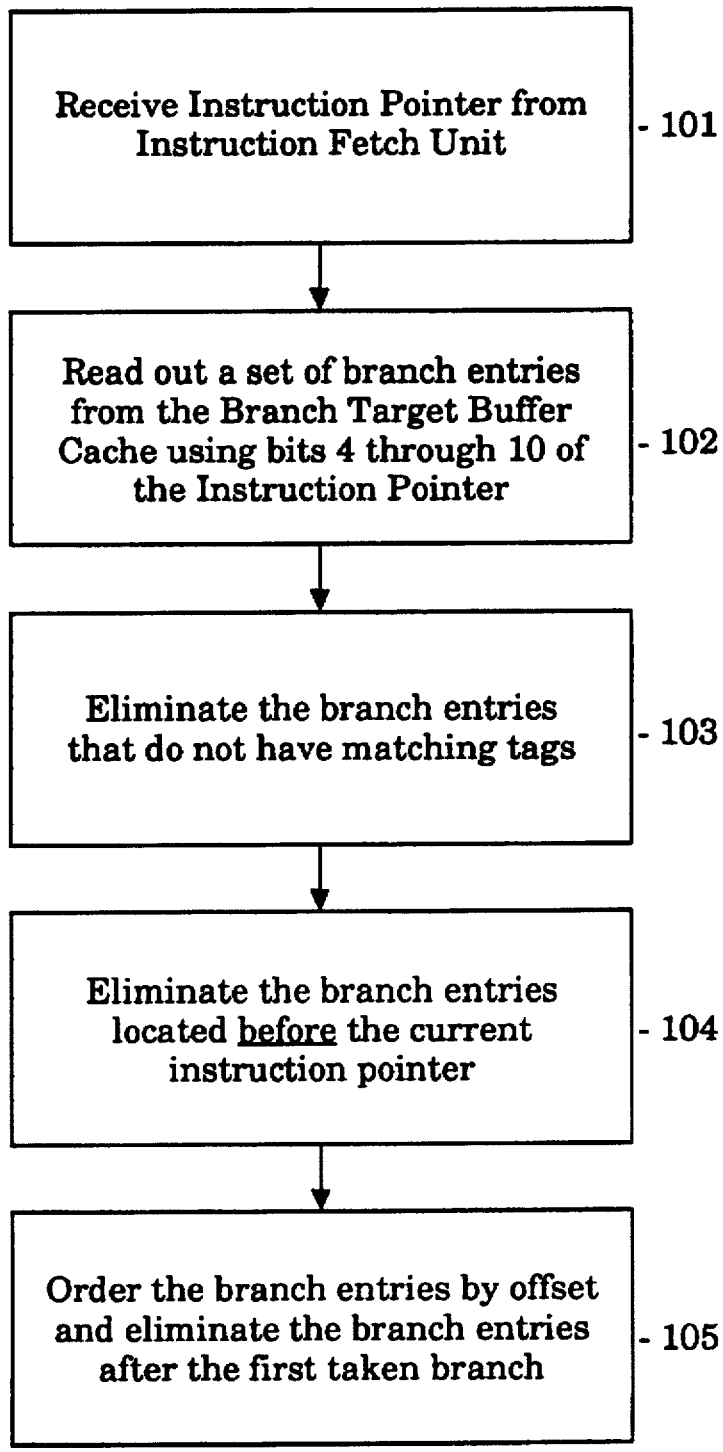
FIG. 8 is a flow diagram explaining the steps performed by the Branch Target Buffer Circuit when searching Branch Target Buffer Cache to make a branch prediction.

The Instruction Fetch Unit 30 requests information about upcoming branch instructions by passing an instruction pointer to the Branch Target Buffer Circuit 40. FIG. 8 illustrates the steps performed by the Branch Target Buffer Circuit 40 when searching the Branch Target Buffer Cache 41 for upcoming branch instructions. At step 101, the Branch Target Buffer Circuit 40 receives the instruction pointer from the Instruction Fetch Unit 30.

Figure 9A:
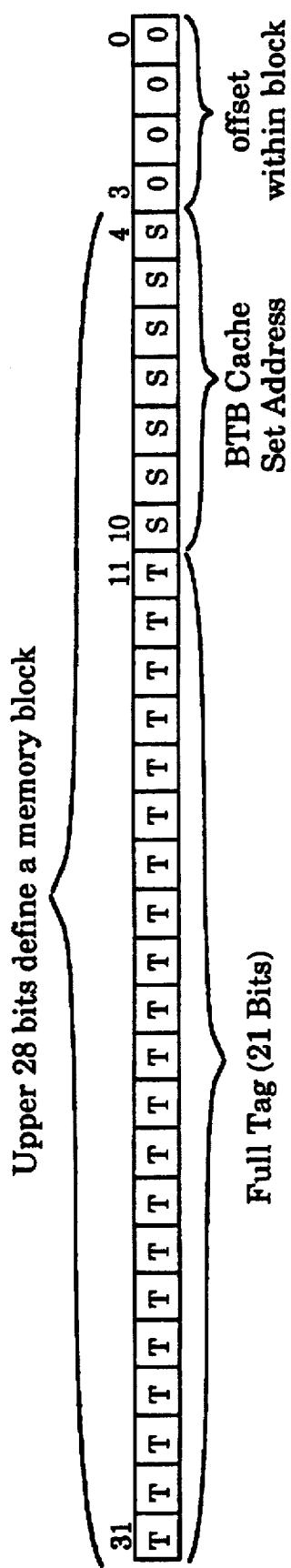
FIG. 9a illustrates how the Branch Target Buffer Circuit uses addresses when accessing the Branch Target Buffer Cache.

At step 102, the Branch Target Buffer Circuit 40 reads out a set of four branch entries from the Branch Target Buffer Cache 41 using the instruction pointer. To clarify how the Branch Target Buffer Circuit 40 uses the instruction pointer, FIG. 9a illustrates the individual bits of the 32 bit instruction pointer address as used by the Branch Target Buffer Cache 41 to identify the address of a branch instruction. The upper 28 bits of the address identify a memory block. The 4 least significant bits of an address designate an offset location within a 16 byte block. In the Branch Target Buffer Cache 41, each entry contains an block offset 402 that locates the last byte of the associated branch instruction within a 16 byte block.

The upper 28 bits of an address identifying a memory block can be divided into two separate sections. The uppermost 21 bits (bits 11 though 31) represent a tag that is associated with each branch entry in the Branch Target Buffer Cache 41. The remaining 7 bits (bits 4 though 10) are the "set bits" that identify a set of branch entries within the Branch Target Buffer Cache 41.

The Branch Target Buffer Circuit 40 indexes into the Branch Target Buffer Cache 41 using the seven set bits (bits 4 though 10) of the instruction pointer to select a set of branch entries. The Branch Target Buffer Circuit 40 then reads out the selected set of branch entries.

At step 103, the Branch Target Buffer Circuit 40 examines the four branch entries within the selected set to determine if any of the four branch entries contain information about a branch instruction in the 16 byte block pointed to by the instruction pointer. Specifically, the Branch Target Buffer Circuit 40 compares a 9 bit compressed version of the upper 21 bits of the instruction pointer address with the hashed tag field 401 within each branch entry to eliminate branch entries that do not match.

To reduce the die area required to construct the Branch Target Buffer Cache 41, each branch entry in the Branch Target Buffer Cache 41 stores a compressed tag address. In the preferred embodiment, the full 21 bit tag value is run through a hash mechanism that reduces the tag to 9 bits. The compression of the tag address loses some information and thus causes some aliasing. The aliasing created by the compressed tag occasionally causes branch mispredictions. However, any branch mispredictions are eventually cured by the Branch Address Calculator 50 or the Branch Execution Unit 92 in the microprocessor.

The Branch Target Buffer Logic 40 of the present invention uses two different hashing mechanisms to compress the tag address. Both hashing mechanisms reduce the full 21 bit tag address into a 9 bit hashed tag. A machine specific register (MSR) in the microprocessor selects one of the two types of hashing mechanisms.

Figure 9B:
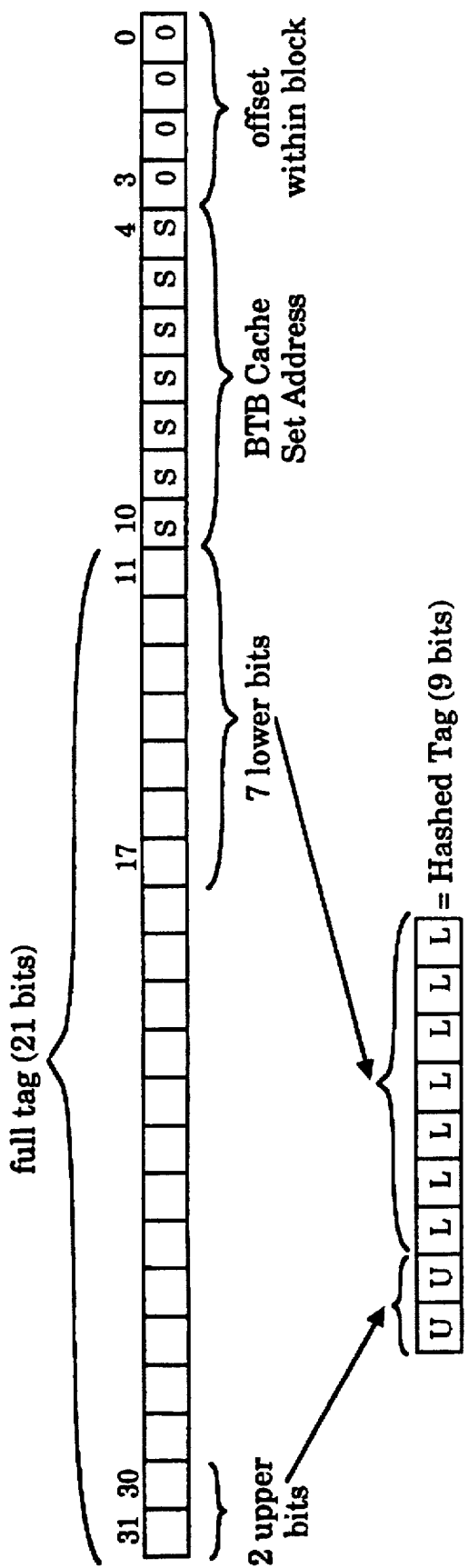
FIG. 9b illustrates a first hashing mechanism that reduces 21 bit tags into 9 bit hashed tags.

FIG. 9b illustrates the operation of the first hashing mechanism. The first hashing mechanism concatenates the 2 most significant bits (bits 30 and 31) of the full tag address with the 7 least significant bits (bits 11 though 17) of the full tag address to create a 9 bit hashed tag. This first hashing mechanism works well for programs that usually jump locally such that the low seven bits are useful, but occasionally jump to an Operating System routine far away such that the two most significant bits are useful.

Figure 9C:
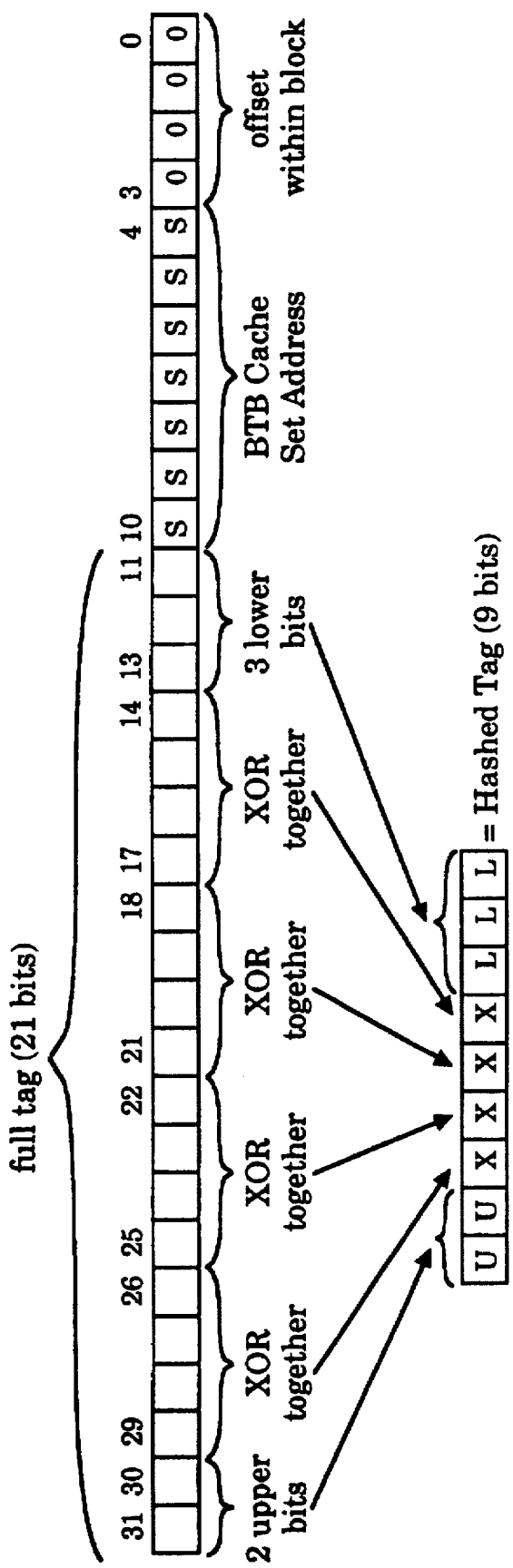
FIG. 9c illustrates a second hashing mechanism that reduces 21 bit tags into 9 bit hashed tags.

FIG. 9c illustrates the operation of the second hashing mechanism. The second hashing mechanism concatenates the 2 most significant bits (bits 30 and 31) of the full tag address, a 4 bit exclusive-OR (XOR) combination of the next 16 bits in the full tag address (bits 14 though 29), and the 3 least significant bits (bits 11 though 13) of the full tag address to create a 9 bit hashed tag. The 4 bit exclusive-OR (XOR) combination is created by combining together the middle 16 bits (bias 14 though 29) in groups of four as illustrated in FIG. 9c. The second hashing mechanism works well for programs that jump any where in the address space since all tag bits are taken into consideration. Note that the 2 most significant bits (bits 30 and 31) are preserved in order to detect calls to Operating System routines that are far away from the current address.

When examining the Branch Target Buffer Cache 41, the Branch Target Buffer Logic 40 runs the upper 21 bits of the current instruction pointer through hashing mechanism and compares the hashed instruction pointer value against the hashed tag fields 401 in the four branch entries of the selected set. The Branch Target Buffer Logic 40 eliminates those branch entries having a hashed tag field 401 that does not match the value of the current hashed instruction pointer.

At step 104, the Branch Target Buffer Logic 40 eliminates the branch entries in the selected set that identify branch instructions located before the current instruction pointer. For example, referring to again to the memory map of FIG. 4, a four byte long branch instruction is illustrated at the hexadecimal addresses 1E to 21. The branch instruction at hexadecimal addresses 1E to 21 is placed into a branch entry in the Branch Target Buffer Cache 41 and associated with the hexadecimal address 21 since that is the address of the last byte of the branch instruction. Thus the block offset field 402 of the branch entry will be set to 1. If the current instruction pointer points to the hexadecimal address 23, then the Branch Target Buffer Logic 40 eliminates all branch entries that have values less than 3 in the block offset field 402 such that the branch entry for the branch instruction at hexadecimal address 21 is no longer considered.

The remaining branch entries describe branch instructions within the 16 byte block pointed to by the current instruction pointer and are located after the current instruction pointer. At step 105, the Branch Target Buffer Logic 40 orders the remaining branch entries using the block offset field 402 of the remaining branch entries. The Branch Target Buffer Logic 40 then selects the first "taken" branch instruction from the remaining ordered branch entries if there is a "taken" branch instruction. To select the first taken branch instruction from the remaining ordered branch entries, the Branch Target Buffer Logic 40 must make branch outcome predictions for all the remaining branch entries in the selected set.

Predicting Branch Outcomes and Branch Target Addresses

To make a branch outcome prediction for each entry, the Branch Target Buffer Circuit 40 first reads the branch type field 403. The Branch Target Buffer Circuit 40 handles the branch prediction differently depending upon what type of branch instruction is predicted.

The branch type field designates if the predicted branch instruction is a conditional, an unconditional, a Call Subroutine, or a Return From Subroutine branch instruction. Note that although Call Subroutine and Return From Subroutine instructions are specific types of unconditional branch instructions, those two instructions are marked as different types. The Branch Target Buffer Circuit 40 marks Call Subroutine and Return From Subroutine instructions as different types since the Branch Target Buffer Circuit 40 performs special operations when those two types of branch instruction are predicted.

The following Table 2 summarizes how the Branch Target Buffer Circuit 40 predicts branch outcomes and target addresses for the four types of branch instructions stored within the Branch Target Buffer Cache 41.

TABLE 2

| Branch Type | Branch Target Buffer Circuit Action | |
|---|---|---|
| | Branch Outcome Prediction | Branch Target Address Prediction |
| Unconditional Branch Instruction(Other than Call Subroutine or Return From Subroutine) | Predict taken | Predict branch target address from target field in Branch Target Buffer Cache |
| Conditional Branch Instruction | Predict branch outcome using branch history and branch pattern table | Predict branch target address from target field in Branch Target Buffer Cache |
| Call Subroutine Instruction | Predict taken | Predict branch target address from target field in Branch Target Buffer Cache |
| Return From Subroutine Instruction | Predict taken | Predict from Return Register if Return Register valid bit set else predict from RSB using BTB TOS pointer |

As set forth in Table 2, all branch instructions other than conditional branch instructions are predicted taken. To predict the outcome of a conditional branch instruction, the Branch Target Buffer Circuit 40 uses the Yeh & Part two-level adaptive branch prediction mechanism. (See Tse Yu Yeh and Yale N. Patt, *Two-Level Adaptive Branch Prediction*. The 24th ACM/IEEE International Symposium and Workshop on Microarchitecture, November 1991, pp. 51–61) The two-level Yeh & Patt branch prediction mechanism dynamically maintains two levels of branch history.

The first level of branch history maintained in the two-level adaptive branch prediction mechanism is the taken or not-taken branch history stored within each branch entry. For example, a "not-taken, taken, taken, not-taken" branch history is represented by "0110". In the present embodiment, two versions of the branch history are stored: a true branch history and a speculative branch history. The true branch history stores the last four outcomes of the branch instruction as determined by the Branch Execution Unit 92. The speculative branch history stores the last four outcomes of the branch instruction as predicted by the Branch Target Buffer Circuit 40. The speculative history is used to get around the problem of predicting branch instructions within small (or "tight") loops since the true history might not be updated fast enough. This document will concentrate on the true branch history, however, additional information about the speculative branch history can be found in the copending patent application "Speculative History Mechanism in a Branch Target Buffer", Ser. No. 08/591,233, filed Jan. 18, 1996, which is a continuation of Ser. No. 08/062,102, filed May 14, 1993, now abandoned.

Figures 10A, 10B:
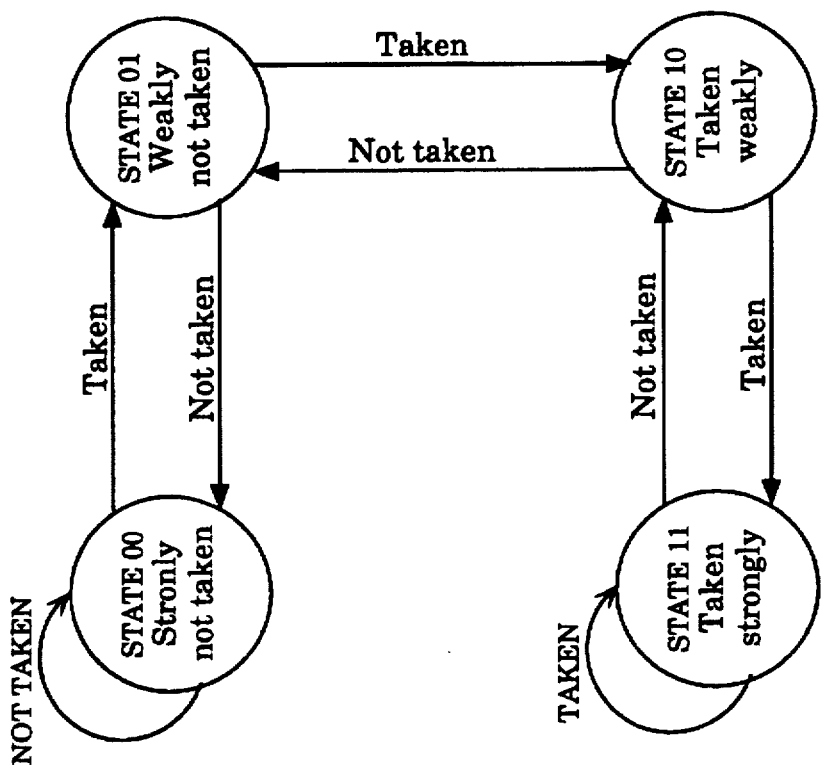
FIG. 10a illustrates a 4 bit branch history indexing into a 16 entry pattern table wherein each entry is a 2 bit state value.
FIG. 10b is a state diagram that illustrates the state changes for each 2 bit state value in a branch pattern table.

The second level of branch history maintained in the two-level adaptive branch prediction mechanism is the branch pattern history. The branch pattern history indicates the likely outcome of a branch instruction based upon the previous branch outcomes of the branch instruction with identical branch histories. The branch pattern history is stored as a two-bit state value for each possible branch history pattern. Since the present embodiment stores 4 bits of branch history, there are 16 state values for the 16 possible branch history patterns as illustrated in FIG. 10a. The two-bit state value classifies branch patterns into strongly taken, weakly taken, weakly not-taken, and strongly not-taken as illustrated in FIG. 10b.

The branch pattern history is created from previous occurrences of the same branch pattern. Each time a conditional branch instruction is resolved, the branch pattern table is updated using the Lee & Smith saturating up/down counter as illustrated by the state transition arrows in FIG. 10b.

A branch prediction example is provided with reference to FIGS. 10a. Referring to FIG. 10a, 4 bits of branch history store a "not-taken, taken, taken, not-taken" ("0110") pattern for a conditional branch instruction. The 4 bit branch pattern is used to index into a branch pattern table that stores branch pattern history state values for each branch pattern. In FIG. 10a, the "0110" branch pattern indexes to a "10" state value that represents the "weakly taken" state. The branch prediction mechanism will therefore predict the branch will be taken. When the branch instruction is resolved by the Branch Execution Unit 92, the Branch Execution Unit 92 updates both the branch history for the branch and the appropriate state value entry in a branch pattern table.

After the Branch Target Buffer Circuit 40 determines the branch outcome for all conditional branch instructions in the ordered set, the Branch Target Buffer Circuit 40 searches for the first taken branch instruction. If no branch instructions are predicted taken, then the Instruction Fetch Unit 30 fetches the next sequential memory block. However, if there is a taken branch instruction in the selected set, then the Branch Target Buffer Circuit 40 predicts a branch target address for the first taken branch instruction.

Table 2 describes how the Branch Target Buffer Circuit 40 predicts a branch target address for each type of branch instruction as indicated in the branch type field 403 when the branch instruction is predicted taken. As stated in Table 2 The Branch Target Buffer Circuit 40 handles unconditional, conditional, and Jump To Subroutine branch instructions by predicting a branch to the address provided in the branch target address field 408 of the Branch Target Buffer Cache 41 entry. However, Return From Subroutine instructions are handled differently.

When the Branch Target Buffer Circuit 40 predicts a taken Return From Subroutine instruction, the Branch Target Buffer Circuit 40 predicts a return address from a Return Register or from a Return Stack Buffer within the Branch Address Calculator 50. More information about the prediction of return addresses for Return From Subroutine instructions can be found in the copending patent application "Method and Apparatus for Resolving Return From Subroutine Instructions in a Computer Processor", Ser. No. 08/176,065, filed Jan. 4, 1994.

The Branch Target Buffer Circuit 40 passes the predicted branch target address to the Instruction Fetch Unit 30. The Instruction Fetch Unit 30 then fetches the next memory block using the predicted branch target address.

The Branch Instruction Pointer Table

In addition to the Branch Target Buffer Cache 41, the Branch Target Buffer Circuit 40 also maintains another cache called the Branch Instruction Pointer (IP) Table 43. The Branch IP Table 43 stores information about all unresolved branch micro-ops currently within the microprocessor. After each branch micro-op has been executed, the information stored within the Branch IP Table 43 is retrieved to update the Branch Target Buffer Cache 41 or restart the microprocessor in the case of a branch misprediction.

FIG. 11 illustrates the Branch IP Table 43 of the present invention. The Branch IP Table 43 comprises a buffer containing n branch entries (0 to n−1) wherein n equals the number of entries in the Reorder Buffer 83. Each branch information entry within the Branch IP Table 43 comprises a Next Linear Instruction Pointer (NLIP) address field and a processor state information field.

The Next Linear Instruction Pointer (NLIP) address field stores the address of the instruction immediately following the branch instruction associated with the branch micro-op. The Instruction Fetch Unit 30 uses the Next Linear Instruction Pointer (NLIP) address when a branch is mispredicted taken when the branch should not have been taken.

The Next Linear Instruction Pointer (NLIP) address is also used to index into the Branch Target Buffer Cache 41 when allocating new branch entries or updating the branch history information in existing branch entries. When allocating a new branch entry or updating an existing branch entry, the Next Linear Instruction Pointer (NLIP) address is decremented by one to produce the address of the last byte of the branch instruction. The address of the last byte of the branch instruction is used by the Branch Target Buffer Circuit 40 to index into the Branch Target Buffer Cache 41.

The processor state information field is used to store state information that may be corrupted when the microprocessor begins speculative execution after making a branch prediction. If the microprocessor is speculatively executing down the wrong path due to a branch misprediction, the state information can be restored from the Branch IP Table 43 when the misprediction is detected. In the present embodiment, the microprocessor state information field stores a stack pointer for the Return Stack Buffer in the Branch Address Calculator 50.

As stated in the microprocessor overview, when the Allocator 70 assigns a pDst entry in the reorder buffer 83 for a branch micro-op, a corresponding entry in the Branch IP Table 43 is assigned. The Instruction Decoder 60 informs the Branch Target Buffer Circuit 40 about the assigned pDst entry, the processor state information, and the Next Linear Instruction Pointer (NLIP) address. The Branch Target Buffer Circuit 40 writes the processor state information and the Next Linear Instruction Pointer (NLIP) address into a corresponding entry in the Branch IP Table 43. More information about the Branch IP Table 43 can be found in the copending patent application "Method and Apparatus for a Branch Instruction Pointer Table", Ser. No. 08/176,065, filed Jan. 4, 1994.

Updating the Branch Target Buffer Cache

Referring to FIG. 2, each branch micro-op remains at the reservation station 81 entry until all the source data required to execute the branch micro-op has been obtained and the Branch Execution Unit 92 is available. When the source data required to execute the branch micro-op is ready, the reservation station 81 sends the branch micro-op to the Branch Execution Unit 92.

The Branch Target Buffer Circuit 40 monitors the bus used to send micro-ops from the reservation station 81 to the Branch Execution Unit 92. Upon seeing the reservation station 81 issue a branch micro-op to the Branch Execution Unit 92, the Branch Target Buffer Circuit 40 notes which pDst entry number in the reorder buffer 83 will be used to store the branch micro-op result. As the Branch Execution Unit 92 executes the branch micro-op, the Branch Target Buffer Circuit 40 reads out an entry in the Branch IP Table 43 having the same entry number as the reorder buffer 83 pDst entry. In this manner, the stored branch information associated with the branch micro-op being executed will be available when the branch micro-op is resolved.

The Branch Execution Unit 92 executes the branch micro-op by determining a final branch target address and a final branch outcome (taken or not-taken). The Branch Execution Unit 92 compares the final branch outcome of the branch with a predicted branch outcome to see if the branch prediction was correct. If the branch prediction was correct, then the processor continues along the predicted path. However, if the branch prediction was wrong, the Branch Execution Unit 92 must flush the front-end of the microprocessor pipeline and restart the microprocessor at the correct address. If the branch instruction was predicted taken and the final branch outcome was instead not-taken, the microprocessor must resume execution at the address of the instruction immediately following the branch instruction. The Branch Execution Unit 92 handles this situation by flushing the front-end of the microprocessor pipeline and instructing the Instruction Fetch Unit 30 to resume execution at the Next Linear Instruction Pointer (NLIP) address as provided by the Branch IP Table 43.

After the Branch Execution Unit 92 executes a branch micro-op, the Branch Target Buffer Circuit 40 must allocate a new entry or update an existing entry in the Branch Target Buffer 41. To access the proper set in the Branch Target Buffer Cache 41, the Branch Target Buffer Circuit 40 must have the address of the last byte of the branch instruction. To calculate the last byte of the branch instruction, the Branch Target Buffer Circuit 40 decrements the Next Linear Instruction Pointer (NLIP) address obtained from the Branch IP Table 43.

To provide information for the updating the Branch Target Buffer Cache 41, the Branch Execution Unit 92 transfers information about the resolved branch instruction to the Branch Target Buffer Circuit 40. Specifically, the Branch Execution Unit 92 informs the Branch Target Buffer Circuit 40 what type of branch instruction was executed, whether the branch was taken or not-taken, and the branch target address. The Branch Target Buffer Circuit 40 uses the resolved branch information to update the Branch Target Buffer Cache 41.

Figure 12:
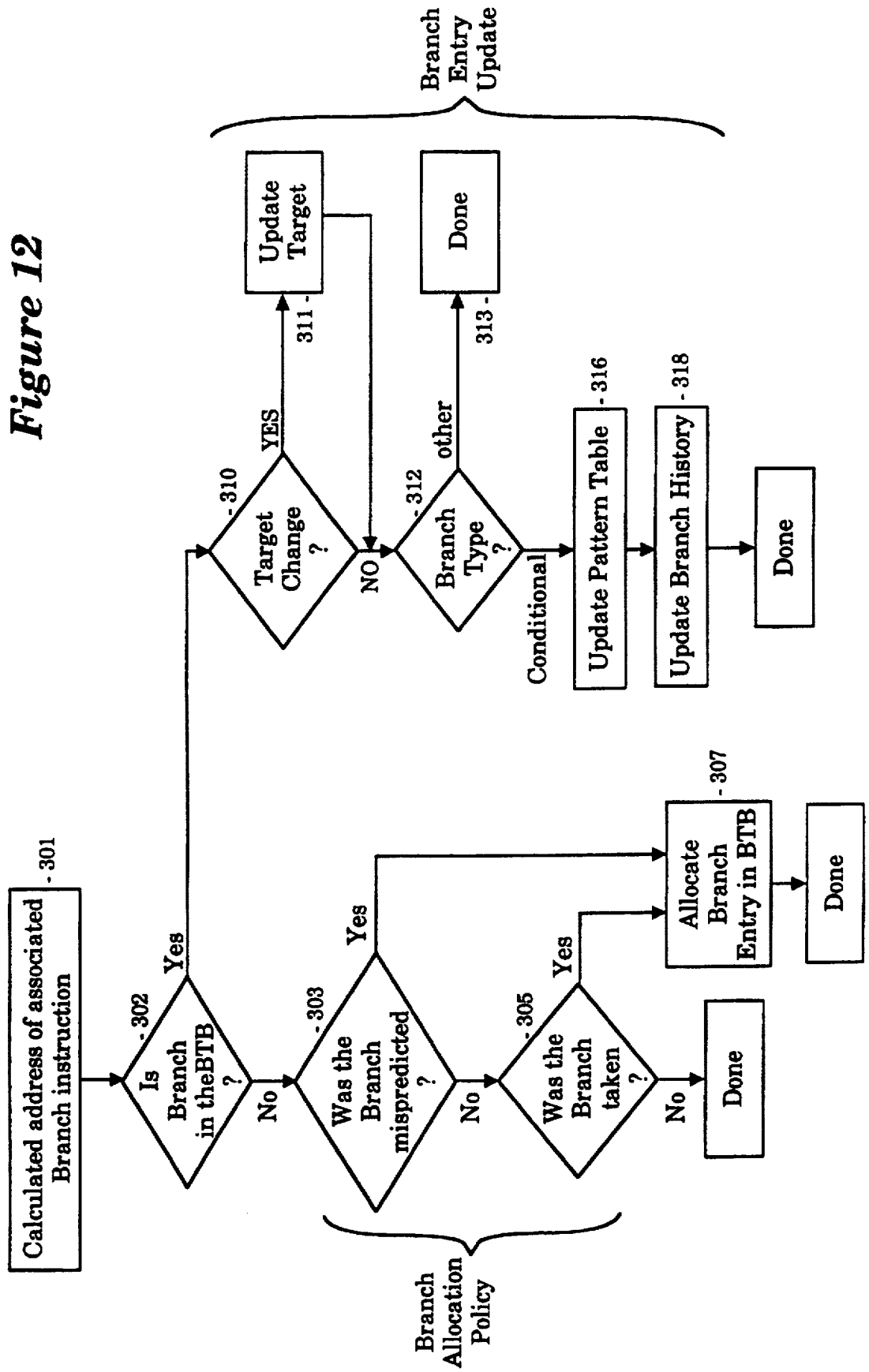
FIG. 12 is a flow diagram that describes the steps performed by the Branch Target Buffer Circuit when updating the Branch Target Buffer Cache.

FIG. 12 illustrates the steps the Branch Target Buffer Circuit 40 performs when updating the Branch Target Buffer Cache 41. At step 301, the Branch Target Buffer Circuit 40 decrements the Next Linear Instruction Pointer (NLIP) address read out of the Branch IP Table 43 to calculate the address of the last byte branch instruction. The Branch Target Buffer Circuit 40 uses the address of the last byte branch instruction to index into the Branch Target Buffer Cache 41.

At step 302, the Branch Target Buffer Circuit 40 indexes into the Branch Target Buffer Cache 41 to see if a branch entry already exists in the Branch Target Buffer Cache 41 for the branch instruction. Specifically, the Branch Target Buffer Circuit 40 indexes into the Branch Target Buffer Cache 41 with the set bits of the calculated branch instruction address looks for a branch entry with a matching hashed tag field 401 and block offset field 402.

If the Branch Target Buffer Circuit 40 cannot find a branch entry in the Branch Target Buffer Cache 41 for the branch instruction, then the Branch Target Buffer Circuit 40 uses an allocation policy to decide if the branch instruction should be added to the Branch Target Buffer Cache 41. The allocation policy is explained later in this specification. Alternatively, if the Branch Target Buffer Circuit 40 finds a branch entry in the Branch Target Buffer Cache 41 for the branch instruction, then the Branch Target Buffer Circuit 40 proceeds to update the branch entry starting at step 310.

Updating an Existing Branch Entry in the Branch Target Buffer Cache

The entire process of updating an existing branch entry in the Branch Target Buffer Cache 41 requires 3 machine cycles. An update to an existing branch entry in the Branch Target Buffer Cache 41 can be aborted by the Branch Target Buffer Circuit 40 if it is determined that the branch entry should not be updated.

Referring to step 310 of FIG. 12, the Branch Target Buffer Circuit 40 compares the branch target address in the branch entry with the branch target address calculated by the Branch Execution Unit 92 unless the branch is a Return From Subroutine Instruction. If the two target addresses do not match, the Branch Execution Unit 92 updates the branch target address at step 311.

Referring to step 312 of FIG. 12, the Branch Target Buffer Circuit 40 examines the branch type provided by the Branch Execution Unit 92. If the branch type is an unconditional branch instruction, then the Branch Target Buffer Circuit 40 is done updating the branch entry. If the branch instruction is a conditional branch instruction, then the Branch Target Buffer Circuit 40 proceeds to update the branch pattern table a branch history.

At step 316, the Branch Target Buffer Circuit 40 updates the branch pattern table 421 for the set that contains the branch entry. The branch pattern table 421 is updated by indexing into the branch pattern table 421 with the existing true branch history 404 and changing the state value using latest branch result according to the state transition table as illustrated in FIG. 10b. The branch pattern table 421 must be update before the true branch history field 404 is updated since the current history in the true branch history field 404 is needed to index into the branch pattern table 421.

After updating the branch pattern table at step 316, the Branch Target Buffer Circuit 40 updates the true branch history field 404 at step 318. The Branch Target Buffer Circuit 40 updates true branch history field 404 by shifting the latest branch outcome of the conditional branch instruction as calculated by the Branch Execution Unit 92 into the true branch history field 404. This completes the branch entry updating for a conditional branch instruction.

The Branch Target Buffer Circuit 40 updates each branch entry in the Branch Target Buffer Cache 41 two machine cycles after the Branch Execution Unit 92 has executed the branch micro-op associated with the branch instruction. However, since the microprocessor containing the Branch Target Buffer Circuit 40 can execute micro-ops out of the original program order, the Branch Target Buffer Circuit 40 may update the Branch Target Buffer Cache 41 out of the original program order.

In most cases, updating the Branch Target Buffer Cache 41 out of the original program order causes no problems. However, when the Branch Execution Unit 92 detects a branch misprediction while executing a branch after a later branch had already executed, the later branch would have been updated with invalid history. To help remedy this situation, the Branch Target Buffer Circuit 40 may abort the update of a branch entry if the Branch Target Buffer Circuit 40 learns that the branch should not have been executed within the next 2 cycles. An example of this situation is explained with reference to FIG. 13.

Figure 13:
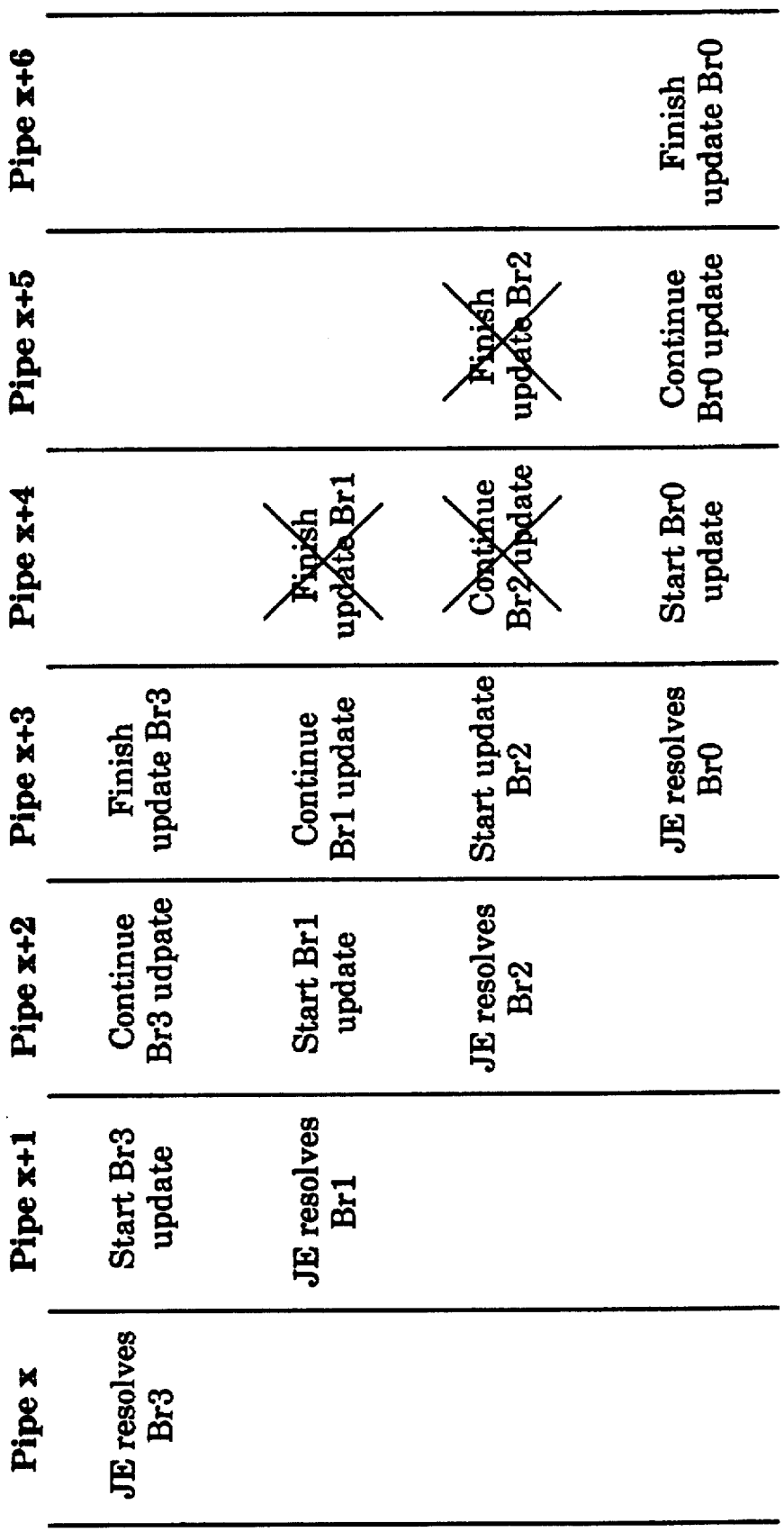
FIG. 13 is a diagram that illustrates how the 3 cycle update to the Branch Target Buffer Cache can be aborted.

Consider four branch instructions named Br0, Br1, Br2, and Br3 that appear in that order within a computer program. In the microprocessor illustrated by FIG. 2, the associated branch micro-ops may executed in any order. In FIG. 13, the four branch instructions are executed the following order Br3, Br1, Br2, and finally Br0.

Referring to pipe x of FIG. 13, the Branch Execution Unit resolves Br3. At the next pipe, pipe x+1, the Branch Execution Unit resolves Br1 and the Branch Target Buffer Circuit 40 starts updating the branch entry for Br3. At pipe x+2, the Branch Execution Unit resolves Br2 while at the same time the Branch Target Buffer Circuit 40 starts updating the branch entry for Br1 and continues updating the branch entry for Br3. At pipe x+3, the Branch Execution Unit resolves Br0 while at the same time the Branch Target Buffer Circuit 40 starts updating the branch entry for Br2, continues updating the branch entry for Br1, and finishes updating the branch entry for Br3.

If the Branch Execution Unit determines that branch Br0 was mispredicted, then the subsequent branch instructions should not have been executed since the microprocessor was speculatively executing down the wrong path. More importantly, the branch histories for branch instructions Br1, Br2, and Br3 should not be updated since these branch instructions should not have been executed thus any new branch history would be wrong. When the Branch Execution Unit detects the misprediction, the Branch Execution Unit instructs the Branch Target Buffer Circuit 40 to abort all the updates currently be processed. Thus the Branch Target Buffer Circuit 40 aborts the updates for branch instructions Br1 and Br2 as illustrated in FIG. 13. Since the update for Br3 had already completed when the misprediction was detected, it cannot be prevented. However, the ability to abort branch entry updates during the 2 cycles before completion of the update will handle the majority of such cases.

Allocating Branch Entries in the Branch Target Buffer Cache

Referring back to step 302 of FIG. 12, if the Branch Target Buffer Circuit 40 does not find an existing branch entry in the Branch Target Buffer Cache 41 for the branch instruction, the Branch Target Buffer Circuit 40 must determine if a new branch entry in the Branch Target Buffer Cache 41 will be allocated. To determine whether or not to allocate a branch entry, the microprocessor implements a branch entry allocation policy. Steps 303 and 305 implement the branch entry allocation policy of the Branch Target Buffer Cache 41. Simply stated, the branch entry allocation policy of the present invention is to allocate a branch entry for all branch instructions mispredicted by the Branch Address Calculator 50 and all taken branch instructions.

Referring to FIG. 2, the Branch Address Calculator 50 performs static prediction on branch instructions not predicted by the Branch Target Buffer Circuit 40. The static prediction is based only upon the information encoded within the branch instruction itself such that the Branch Address Calculator 50 will always make the same prediction for a given branch instruction. Thus, when the Branch Address Calculator 50 mispredicts a branch instruction, the same misprediction will be repeated over and over again (until the branch outcome changes). To prevent this situation, all branch instructions mispredicted by the Branch Address Calculator 50 are allocated into the Branch Target Buffer Cache 41. Thus, at step 303 of FIG. 12, the Branch Target Buffer Circuit 40 tests if the branch instruction was mispredicted. If the branch was mispredicted, the Branch Target Buffer Circuit 40 allocates a branch entry for the branch instruction within the Branch Target Buffer Cache 41.

If the Branch Address Calculator 50 predicts that a branch instruction will not be taken and the branch prediction is correct, no delay results. Alternatively, when the Branch Address Calculator 50 predicts that a branch instruction will be taken, the Branch Address Calculator 50 must still flush the front-end of the microprocessor and start the Instruction Fetch Unit 30 fetching from the branch target address. Thus, if a branch instruction is taken, there will be a 5 cycle delay whether or not the Branch Address Calculator 50 correctly predicts the branch instruction's outcome. To prevent this situation from recurring, the Branch Target Buffer Circuit 40 allocates a branch entry within the Branch Target Buffer Cache 41 for all taken branch instructions at step. Referring to step 305 of FIG. 12, the Branch Target Buffer Circuit 40 tests if the branch instruction was taken. If the branch instruction was taken, the Branch Target Buffer Circuit 40 allocates a branch entry for the branch instruction within the Branch Target Buffer Cache 41.

Figure 14:
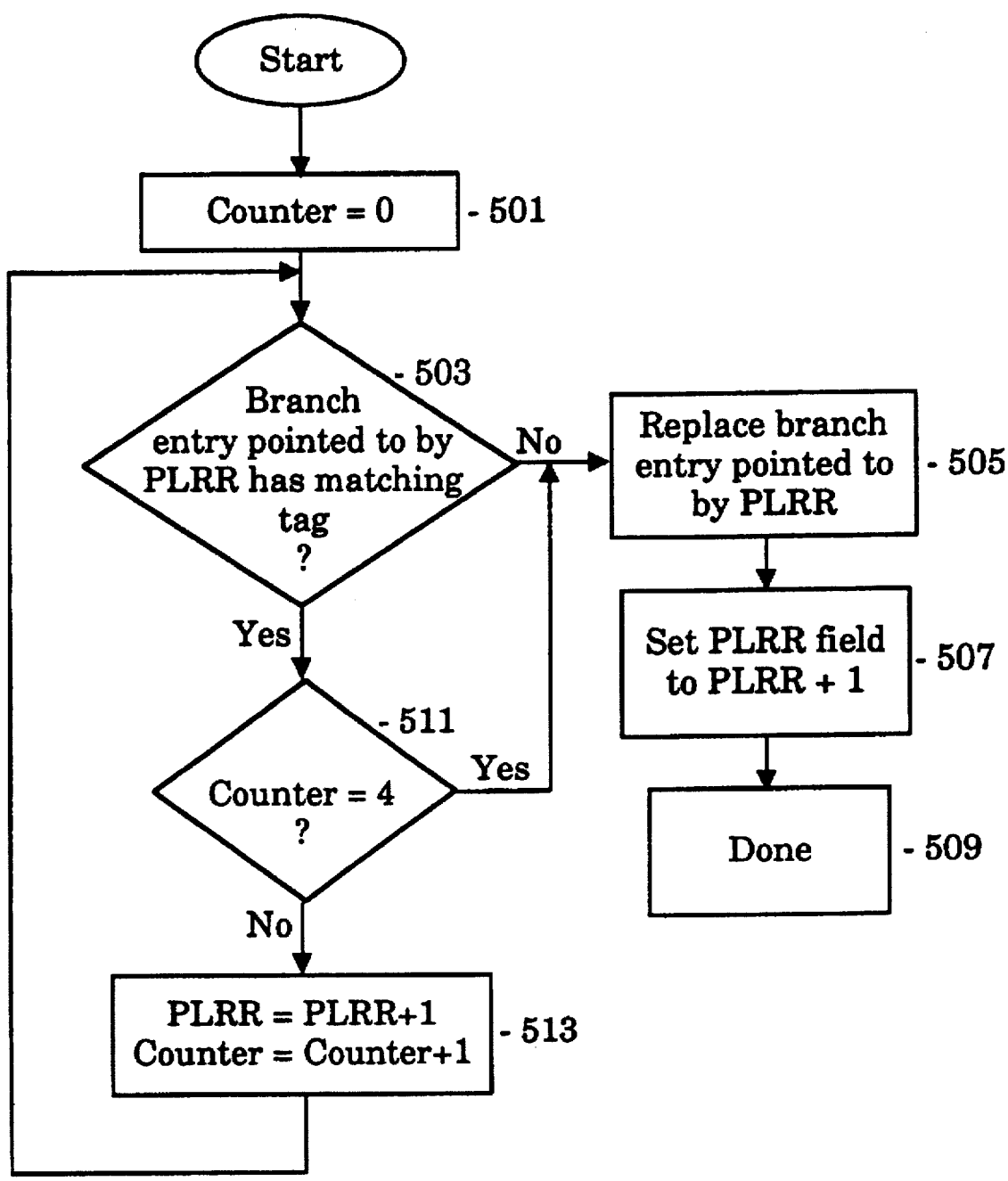
FIG. 14 is a flow diagram that explains how the Branch Target Buffer Circuit selects one of the Branch Entries in a set when allocating a Branch Entry for a new branch instruction.

To select a branch entry from the selected set in the Branch Target Buffer Cache 41, the Branch Target Buffer Circuit 40 uses a pair of Pseudo-Least Recently Replaced (PLRR) bits 420 in the Branch Target Buffer Cache 41 set. The Pseudo-Least Recently Replaced (PLRR) bits 420 indicate which branch entry in the set has been least recently replaced. To selects the branch entry in the selected set, the Branch Target Buffer Circuit 40 reads the Pseudo-Least Recently Replaced (PLRR) bits 420 of the selected set and then follows the branch entry allocation policy illustrated in FIG. 14. The branch entry allocation policy attempts to avoid destroying existing branch entries for branch instructions in the current memory block.

At step 501, the Branch Target Buffer Circuit 40 sets a counter to zero. At step 503, the Branch Target Buffer Circuit 40 tests the branch entry to see if its hashed tag field 401 equals the hashed tag of the branch instruction being allocated. If the two hashed tags do not match, the Branch Target Buffer Circuit 40 proceeds to step 505 where it replaces that branch entry. After replacing the branch entry, the Branch Target Buffer Circuit 40 increments the Pseudo-Least Recently Replaced (PLRR) bits 420 at step 507 and writes the incremented Pseudo-Least Recently Replaced (PLRR) bits back into the set.

If the two hashed tags do match, the Branch Target Buffer Circuit 40 proceeds to step 511 where the Branch Target Buffer Circuit 40 tests the counter to see if all four branch entries have been tested. If all four branch entries have been tested, then the Branch Target Buffer Circuit 40 proceeds to step 505 where it replaces the branch entry pointed to by the Pseudo-Least Recently Replaced (PLRR) bits 420 as originally read out of the branch set. Referring back to step 511, if the all four branch entries have not yet been tested, the Branch Target Buffer Circuit 40 proceeds to step 513 where the counter and the Pseudo-Least Recently Replaced (PLRR) bits are incremented. After step 513, the Branch Target Buffer Circuit 40 returns to step 503 to test the next branch entry.

After a branch entry in the Branch Target Buffer Cache 41 has been selected, the Branch Target Buffer Circuit 40 proceeds to fill in the data fields of the selected branch entry.

If the branch instruction was taken, the Branch Target Buffer Circuit 40 sets the true history field 404 to "1011". Otherwise, if the branch was not taken, the Branch Target Buffer Circuit 40 sets the true history to "0100".

The speculation bit 406 is reset indicating that no speculative history yet exists for the branch entry. The speculative history field 405 is not modified during the branch entry allocation since it will later be set when speculative history is generated.

The hashed tag field 401 and the block offset field 402 are set using address that points to the last byte of the branch instruction. The hashed tag field 401 is set by running the uppermost 21 bits of the address that points to the last byte of the branch instruction through the selected hashing function. The block offset field 402 is set using the lowest 4 bits of the branch address.

The Branch Target Buffer Circuit 40 sets the branch type field 403 using the branch type information received from the Branch Execution Unit 92. The Branch Target Buffer Circuit 40 sets the branch target address field 408 using the branch instruction's target address as calculated by the Branch Execution Unit 92.

Finally, the valid bit 407 for the branch entry is set to indicate that the branch entry contains valid information about a branch instruction. Future occurrences of the branch instruction will be predicted by the Branch Target Buffer Circuit 40.

Deallocating Branch Entries in the Branch Target Buffer Cache

Referring to FIG. 2, the Branch Address Calculator 50 verifies the existence of all branch instructions predicted by the Branch Target Buffer Circuit 40. Entries in the Branch Target Buffer Cache 41 that no longer point to valid branch instructions may cause the Branch Target Buffer Circuit 40 to predict nonexistent branch instructions.

There are several reasons why a branch entry in the Branch Target Buffer Cache 41 may no longer point to valid branch instruction. Self modifying code can change a branch instruction such that the entry in the Branch Target Buffer Cache 41 is no longer accurate. Furthermore, the hashed address tag field 401 causes aliasing such that more than one address maps into each branch entry.

When the Branch Address Calculator 50 determines that the Branch Target Buffer Circuit 40 made a branch prediction for a nonexistent branch instruction, the inaccurate branch entry in the Branch Target Buffer Cache 41 should be deallocated. When the Branch Address Calculator 50 detects a branch prediction for a nonexistent branch instruction, the Branch Address Calculator 50 sends the Branch Target Buffer Circuit 40 a pointer to the first byte of the non-branch instruction. To deallocate the bogus branch entry, the Branch Target Buffer Circuit 40 deallocates all the branch entries in the set defined by the passed pointer and the following set of branch entries. Both the set defined by the passed pointer and the following set of branch entries must be deallocated since the branch instruction, which is placed into the Branch Target Buffer Cache 41 by the address of the last byte, may exists in either of the two sets of branch entries. To deallocate branch entries in a set, the Branch Target Buffer Circuit 40 resets all the valid bits 407 of the branch entries.

The foregoing has described several methods and apparatus for implementing a Branch Target Buffer Circuit that predicts branch instructions within an instruction stream. It is contemplated that changes and modifications may be made by one of ordinary skill in the art, to the materials and arrangements of elements of the present invention without departing from the scope of the invention.

We claim:

1. A method for predicting a plurality of branch instructions within a stream of computer instructions utilizing a branch target buffer cache, said method comprising the steps of:

requesting information about upcoming branch instructions by having an instruction fetch unit pass an instruction pointer to a branch target buffer circuit, said instruction pointer identifying a branch instruction in a memory, said instruction pointer having a set of branch target buffer set address bits and a set of branch target buffer tag address bits;

indexing into said branch target buffer cache with said set of branch target buffer set address bits of said instruction pointer to select a branch set entry, said target buffer cache comprising a plurality of branch set entries, each said branch set entry comprising a set of branch instruction entries, each branch instruction entry storing information about an associated branch instruction including a position with a memory block, all branch instruction entries within a particular branch set entry storing branch instructions having identical branch target buffer set address bits;

reading out said selected branch set entries from said branch target buffer cache;

examining said selected branch set entries from said branch target buffer cache to determine if any of said selected branch set entries contain information about said branch instruction identified by said instruction pointer in said memory;

eliminating said branch set entries which do not match said branch instructions identified by said instruction pointer in said memory; and selecting at least one branch instruction entry in said branch set entries using said branch target buffer tag address bits of said instruction pointer.

2. The method as claimed in claim 1 wherein said step of indexing into said target buffer cache with said set of branch target buffer set address bits of said instruction pointer to select a branch set entry comprises:

indexing into said branch target buffer cache using an address of a last byte of said branch instruction.

3. The method as claimed in claim 1 wherein said step of eliminating said branch set entries which do not match said branch instructions identified by said instruction pointer in said memory further comprises:

eliminating said branch instruction entries located before said instruction pointer.

4. The method as claimed in claim 1 wherein said step of selecting at least one branch instruction entry in said branch set entries using said branch target buffer tag address bits of said instruction pointer further comprises:

selecting a first taken branch instruction entry from the remaining branch set entry and eliminating the remaining branch instruction entries.

5. The method as claimed in claim 1 wherein each said associated branch instruction stored into said branch target buffer cache is stored in said branch target buffer cache using an address of a last byte of each associated branch instruction.

6. A branch instruction prediction mechanism, said branch instruction prediction mechanism predicting a plurality of branch instructions within a stream of computer instructions, said branch instruction prediction mechanism comprising:

an instruction fetch unit, said instruction fetch unit utilizing an instruction pointer for maintaining a current fetch address, said instruction pointer identifying a branch instruction in a memory, said instruction pointer having a set of branch target buffer set address bits and a set of branch target buffer tag address bits;

a branch target buffer cache, said branch target buffer cache comprising a plurality of branch set entries, each of said branch set entries comprising a set of branch instruction entries, each branch instruction entry storing information about an associated branch instruction including a position with a memory block, all branch instruction entries within a particular branch set entry storing branch instructions having identical branch target buffer set address bits; and a branch target buffer circuit, said branch target buffer circuit receiving said instruction pointer, said branch target buffer circuit searching for a first upcoming branch instruction in said memory identified by said instruction pointer, said branch target buffer circuit indexing into said branch target buffer cache with said set of branch target buffer set address bits of said instruction pointer to select a branch set entry, said branch target buffer circuit selecting at least one branch instruction entry in said branch set entry using said branch target buffer tag address bits of said instruction pointer.

7. The branch instruction prediction mechanism as claimed in claim 6 wherein said instruction fetch unit fetches instructions and operands in byte blocks, some of said branch instructions comprising more than one byte in sequential addresses wherein said branch instructions comprising more than one byte may cross over a block boundary, said set of branch instruction entries addressed in said branch target buffer cache by an address of a last byte of said associated branch instruction.

8. The branch instruction prediction mechanism as claimed in claim 6 wherein each branch set entry comprises four branch instruction entries.

9. The branch instruction prediction mechanism as claimed in claim 6 wherein each branch set entry further comprises a branch pattern table.

10. The branch instruction prediction mechanism as claimed in claim 6 wherein each branch set entry further comprises a set of Least Recently Replaced Bits.

11. The branch instruction prediction mechanism as claimed in claim 6 wherein each said associated branch instruction stored into said branch target buffer cache is stored in said branch target buffer using an address of a last byte of each said associated branch instruction.

12. The branch instruction prediction mechanism as claimed in claim 6 wherein each said branch instruction entry in said branch target buffer cache comprises:

a tag address field;

a branch target address; and a valid bit.

13. The branch instruction prediction mechanism as claimed in claim 12 wherein said tag address field comprises a compressed tag address field that is smaller than a full tag address.

14. The branch instruction prediction mechanism as claimed in claim 13 wherein said compressed tag address field comprises a subset of most significant bits from said full tag address concatenated with a subset of least significant bits from said full tag address.

15. The branch instruction prediction mechanism as claimed in claim 13 wherein said compressed tag address field comprises a first subset of most significant bits from said full tag address, an exclusive or combination of a second subset of bits from said full tag address, and a third subset of least significant bits from said full tag address.

16. The branch instruction prediction mechanism as claimed in claim 12 wherein each said branch instruction entry in said branch target buffer cache further comprises a branch type field.

17. The branch instruction prediction mechanism as claimed in claim 16 wherein each said branch instruction entry in said branch target buffer cache further comprises a block offset field that identifies an offset of a last byte of said associated branch instruction.

18. The branch instruction prediction mechanism as claimed in claim 17 wherein each said branch instruction entry in said branch target buffer cache further comprises a branch history field.

19. The branch instruction prediction mechanism as claimed in claim 18 wherein each said branch instruction entry in said branch target buffer cache further comprises a speculation bit and a speculative branch history field.

* * * * *